US010408944B2

(12) United States Patent
Ashjaee

(10) Patent No.: US 10,408,944 B2
(45) Date of Patent: Sep. 10, 2019

(54) HYBRID RTK

(71) Applicant: JAVAD GNSS, Inc., San Jose, CA (US)

(72) Inventor: Javad Ashjaee, Saratoga, CA (US)

(73) Assignee: JAVAD GNSS, INC., San Jose, CA (US)

( * ) Notice: Subject to any disclaimer, the term of this patent is extended or adjusted under 35 U.S.C. 154(b) by 415 days.

(21) Appl. No.: 15/418,474

(22) Filed: Jan. 27, 2017

(65) Prior Publication Data

US 2017/0219715 A1     Aug. 3, 2017

Related U.S. Application Data

(60) Provisional application No. 62/288,994, filed on Jan. 29, 2016.

(51) Int. Cl.
*G01S 19/43*       (2010.01)
*G01S 19/40*       (2010.01)
(Continued)

(52) U.S. Cl.
CPC .............. *G01S 19/43* (2013.01); *G01S 19/09* (2013.01); *G01S 19/40* (2013.01); *G01S 19/41* (2013.01);
(Continued)

(58) Field of Classification Search
CPC .......... G01S 19/34; G01S 19/05; G01S 19/48; G01S 19/25; G01S 19/03; G01S 19/46;
(Continued)

(56) References Cited

U.S. PATENT DOCUMENTS 5,610,614 A    3/1997   Talbot et al.
5,841,026 A   11/1998   Kirk et al.
(Continued)

FOREIGN PATENT DOCUMENTS

JP    2005-189042 A     7/2005
WO   2008/124657 A1   10/2008

OTHER PUBLICATIONS

Carcanague et al., "Low-Cost Single-Frequency GPS/GLONASS RTK for Road Users", Proceedings of The Institute of Navigation Pacific PNT, Apr. 23-25, 2013, pp. 168-184.
(Continued)

*Primary Examiner* — Olumide Ajibade Akonai
(74) *Attorney, Agent, or Firm* — Morrison & Foerster LLP

(57) ABSTRACT

A GNSS device includes an antenna configured to receive a first plurality of GNSS signals from a first plurality of GNSS satellites and a second plurality of GNSS signals from a second plurality of GNSS satellites. The GNSS device also includes a communications interface configured to receive correction signals from a GNSS base unit. A processor of the GNSS device is coupled to the antenna and communications interface for processing data from the first plurality of GNSS signals and the second plurality of GNSS signals. Memory of the GNSS device includes executable instructions for several steps. A first algorithm is executed to determine first position data for the GNSS device based on the first plurality of GNSS signals and a correction signal received at the GNSS device from the GNSS base unit. The first position data is stored memory of the GNSS device. A second algorithm is executed to determine second position data for the GNSS device based on the second plurality of GNSS signals. In response to the second algorithm failing to determine the second position data, GNSS signal data is stored in memory of the GNSS device. The GNSS signal data is based on the second plurality of GNSS signals. The GNSS signal data are transmitted to an external device.

30 Claims, 3 Drawing Sheets

(51) Int. Cl.
  *G01S 19/42* (2010.01)
  *G01S 19/05* (2010.01)
  *G01S 19/25* (2010.01)
  *G01S 19/09* (2010.01)
  *G01S 19/41* (2010.01)

(52) U.S. Cl.
  CPC ............. *G01S 19/426* (2013.01); *G01S 19/05* (2013.01); *G01S 19/258* (2013.01)

(58) Field of Classification Search
  CPC .......... G01S 19/06; G01S 19/07; G01S 19/20; G01S 19/26; G01S 19/33; G01S 19/40; G01S 19/43; H04W 64/00; H04W 4/02
  See application file for complete search history.

(56) References Cited

U.S. PATENT DOCUMENTS

| | | | |
|---|---|---|---|
| 5,916,300 | A | 6/1999 | Kirk et al. |
| 5,936,573 | A * | 8/1999 | Smith ................... G01S 19/20 342/357.27 |
| 5,973,639 | A | 10/1999 | Biacs et al. |
| 8,022,868 | B2 | 9/2011 | Yudanov et al. |
| 8,094,087 | B2 | 1/2012 | Ashjaee et al. |
| 8,120,527 | B2 | 2/2012 | Ashjaee et al. |
| 8,125,376 | B1 | 2/2012 | Ashjaee et al. |
| 8,169,379 | B2 | 5/2012 | Zhukov et al. |
| 8,224,525 | B1 | 7/2012 | Rapoport et al. |
| 8,606,498 | B2 | 12/2013 | Pesterev et al. |
| 8,629,988 | B2 | 1/2014 | Gribkov |
| 8,717,232 | B2 | 5/2014 | Ashjaee et al. |
| 8,717,233 | B2 | 5/2014 | Ashjaee et al. |
| 8,872,700 | B2 | 10/2014 | Ashjaee et al. |
| 8,975,967 | B2 | 3/2015 | Ashjaee et al. |
| 9,103,912 | B2 | 8/2015 | Yudanov et al. |
| 9,168,946 | B2 | 10/2015 | Ashjaee et al. |
| 9,228,835 | B2 | 1/2016 | Gribkov et al. |
| 9,250,328 | B2 | 2/2016 | Ashjaee et al. |
| D756,842 | S | 5/2016 | Ashjaee |
| 9,671,497 | B2 | 6/2017 | Ashjaee et al. |
| 2005/0001762 | A1 | 1/2005 | Han et al. |
| 2007/0057839 | A1 | 3/2007 | Kagawa |
| 2008/0074319 | A1 | 3/2008 | Han et al. |
| 2009/0184869 | A1 * | 7/2009 | Talbot .................... G01S 19/04 342/357.27 |
| 2009/0189804 | A1 * | 7/2009 | Ashjaee ................ G01S 19/14 342/357.27 |
| 2011/0075886 | A1 | 3/2011 | Ashjaee et al. |
| 2011/0156950 | A1 * | 6/2011 | Bhattacharya ........ G01S 5/0036 342/357.31 |
| 2011/0187598 | A1 * | 8/2011 | Dai ......................... G01S 19/44 342/451 |
| 2011/0205109 | A1 | 8/2011 | Miyake et al. |
| 2011/0231057 | A1 | 9/2011 | Ashjaee et al. |
| 2012/0229333 | A1 | 9/2012 | Ashjaee et al. |
| 2012/0256788 | A1 | 10/2012 | Ashjaee et al. |
| 2012/0299936 | A1 | 11/2012 | Ashjaee et al. |
| 2013/0016006 | A1 | 1/2013 | Ashjaee et al. |
| 2013/0080051 | A1 | 3/2013 | Gribkov et al. |
| 2013/0207838 | A1 | 8/2013 | Kobayashi et al. |
| 2014/0062778 | A1 | 3/2014 | Ashjaee et al. |
| 2014/0077865 | A1 | 3/2014 | Ashjaee et al. |
| 2015/0054685 | A1 | 2/2015 | Ashjaee |
| 2015/0100269 | A1 | 4/2015 | Ashjaee |
| 2015/0116145 | A1 | 4/2015 | Ashjaee |
| 2015/0234055 | A1 | 8/2015 | Ashjaee et al. |
| 2016/0018530 | A1 | 1/2016 | Ashjaee |
| 2016/0041268 | A1 | 2/2016 | Ashjaee |
| 2016/0178368 | A1 | 6/2016 | Ashjaee |
| 2016/0178369 | A1 | 6/2016 | Ashjaee |
| 2016/0178754 | A1 | 6/2016 | Ashjaee |

OTHER PUBLICATIONS

Extended European Search Report (includes Supplementary European Search Report and Search Opinion) received for European Patent Application No. 12805269.3, dated Jul. 23, 2014, 8 pages.
International Preliminary Report on Patentability received for PCT Patent Application No. PCT/US2012/032205, dated Oct. 17, 2013, 5 pages.
International Search Report and Written Opinion received for PCT Patent Application No. PCT/US2015/041001, dated Feb. 2, 2016, 24 pages.
International Search Report and Written Opinion received for PCT Patent Application No. PCT/US2012/032205, dated Dec. 26, 2012, 6 pages.
International Search Report and Written Opinion received for PCT Patent Application No. PCT/US2017/015490, dated May 18, 2017, 10 pages.
Invitation to Pay Additional Fees received for PCT Patent Application No. PCT/US2015/041001, dated Oct. 23, 2015, 6 pages.
Notice of Allowance received for U.S. Appl. No. 13/437,366, dated Jul. 3, 2014, 8 pages.
Notice of Allowance received for U.S. Appl. No. 13/437,366, dated Oct. 1, 2014, 2 pages.
Odijk et al., "Single-Frequency Integer Ambiguity Resolution Enabled GPS Precise Point Positioning", Journal of Surveying Engineering, vol. 138, No. 4, Nov. 1, 2012, pp. 193-202.
U.S. Appl. No. 15/284,122, filed Oct. 3, 2016, titled "Stabilizing a Single Legged Support Structure".
U.S. Appl. No. 15/482,625, filed Apr. 7, 2017, titled "Up Sampling Reference Station Data".
U.S. Appl. No. 15/607,307, filed May 26, 2017, titled "Magnetic Locator for GNSS Device".

* cited by examiner

HYBRID RTK

CROSS-REFERENCE TO RELATED APPLICATION

This application claims benefit of U.S. Provisional Application Ser. No. 62/288,994, filed Jan. 29, 2016, which is hereby incorporated by reference in its entirety.

BACKGROUND

1. Field

The present disclosure relates to Global Navigation Satellite System (GNSS) devices and, more specifically, to GNSS devices for performing land surveying using hybrid real-time kinematic (RTK) engine verification.

2. Related Art

Navigation receivers that use global navigation satellite systems, such as GPS or GLONASS (hereinafter collectively referred to as "GNSS"), enable a highly accurate determination of the position of the receiver. The satellite signals may include carrier harmonic signals that are modulated by pseudo-random binary codes and that, on the receiver side, may be used to measure the delay relative to a local reference clock. These delay measurements may be used to determine the pseudo-ranges between the receiver and the satellites. The pseudo-ranges are not true geometric ranges because the receiver's local clock may be different from the satellite onboard clocks. If the number of satellites in sight is greater than or equal to four, then the measured pseudo-ranges can be processed to determine the user's single point location as represented by a vector $X=(x, y, z)^T$, as well as to compensate for the receiver clock offset.

GNSS finds particular application in the field of surveying, which requires highly accurate measurements. The need to improve positioning accuracies has eventually led to the development of differential navigation/positioning. In this mode, the user position is determined relative to an antenna connected to a base receiver or a network of base receivers with the assumption that the positional coordinates of the base receiver(s) are known with high accuracy. The base receiver or receiver network transmits its measurements (or corrections to the full measurements) to a mobile navigation receiver (or rover). The rover receiver uses these corrections to refine its measurements in the course of data processing. The rationale for this approach is that since the pseudo-range measurement errors on the base and rover sides are strongly correlated, using differential measurements will substantially improve positioning accuracy.

Typically, the base is static and located at a known position. However, in relative navigation mode, both the base and rover are moving. In this mode, the user is interested in determining the vector between the base and the rover. In other words, the user is interested in determining the continuously changing rover position relative to the continuously changing position of the base. For example, when one aircraft or space vehicle is approaching another for in-flight refueling or docking, a highly accurate determination of relative position is important, while the absolute position of each vehicle is generally not critical.

The position of the rover changes continuously in time, and thus should be referenced to a time scale. The determination of the position of a mobile rover with respect to a base receiver in real-time may be performed using an RTK algorithm, which may be stored in memory on the rover. As the name "real-time kinematic" implies, the rover receiver is capable of calculating/outputting its precise position as the raw data measurements and differential corrections become available at the rover. When implementing an RTK algorithm, a data communication link (e.g., a radio communication link, a GSM binary data communication link, etc.) may be used to transmit the necessary information from the base to the rover.

Further improvement of the accuracy in differential navigation/positioning applications can be achieved by using both the carrier phase and pseudo-range measurements from the satellites to which the receivers are locked. For example, by measuring the carrier phase of the signal received from a satellite in the base receiver and comparing it with the carrier phase of the same satellite measured in the rover receiver, one can obtain measurement accuracy to within a small fraction of the carries wavelength.

One well-known type of measurement error that can reduce the accuracy of differential navigation/positioning is multipath error. Multipath errors are caused by the reflection of the GNSS satellite signals by surfaces located near the receiving antenna. As a result of these reflections, the antenna receives both the direct signal traveling the shortest path from the satellite to the receiver as well as the reflected signals following indirect paths. The combination of two (or more) signals at the antenna leads to the distortion of raw measurements. Multipath errors may affect both pseudo-range and carrier phase measurements.

BRIEF SUMMARY

In one embodiment, a method of determining a position of a global navigation satellite system (GNSS) device includes receiving a first plurality of GNSS signals from a first plurality of GNSS satellites at the GNSS device. The GNSS device also receives a correction signal from a GNSS base unit. A first algorithm is executed to determine first position data for the GNSS device based on the first plurality of GNSS signals and the correction signal. The first position data is stored in memory. The GNSS device receives a second plurality of GNSS signals from a second plurality of GNSS satellites. A second algorithm is executed to determine second position data for the GNSS device based on the second plurality of GNSS signals. In response to the second algorithm failing to determine the second position data, GNSS signal data is stored in memory of the GNSS device. The GNSS signal data is based on the second plurality of GNSS signals. The GNSS signal data is transmitted to a server for processing.

In the following description, reference is made to the accompanying drawings which form a part thereof, and which illustrate several examples of the present disclosure. It is understood that other examples may be utilized and structural and operational changes may be made without departing from the scope of the present disclosure. The use of the same reference symbols in different drawings indicates similar or identical items.

DETAILED DESCRIPTION

The following description is presented to enable a person of ordinary skill in the art to make and use the various embodiments. Descriptions of specific devices, techniques, and applications are provided only as examples. Various modifications to the examples described herein will be readily apparent to those of ordinary skill in the art, and the general principles defined herein may be applied to other examples and applications without departing from the spirit and scope of the technology as claimed. Thus, the various embodiments are not intended to be limited to the examples described herein and shown, but are to be accorded the scope consistent with the claims.

During a site survey, it may be necessary to take position measurements in a wide variety of conditions. For some measurements, it may be easy to receive a correction signal and GNSS signals to determine the position of a point of interest. For other measurements, however, the ability to receive correction signals may be difficult or the line-of-sight to GNSS satellites may be obscured by trees, buildings, or other obstructions. In these conditions, it may be difficult or impossible to get an accurate measurement of the position of a point-of-interest. Some of the embodiments of the technology described below address this issue by storing raw GNSS or similar data when an accurate measurement of the position of a point-of-interest cannot be made. The raw GNSS or similar data may then be post-processed to obtain an accurate measurement of the position. For points of interest where accurate measurements can be made, only the position data needs to be stored.

Figure 1:
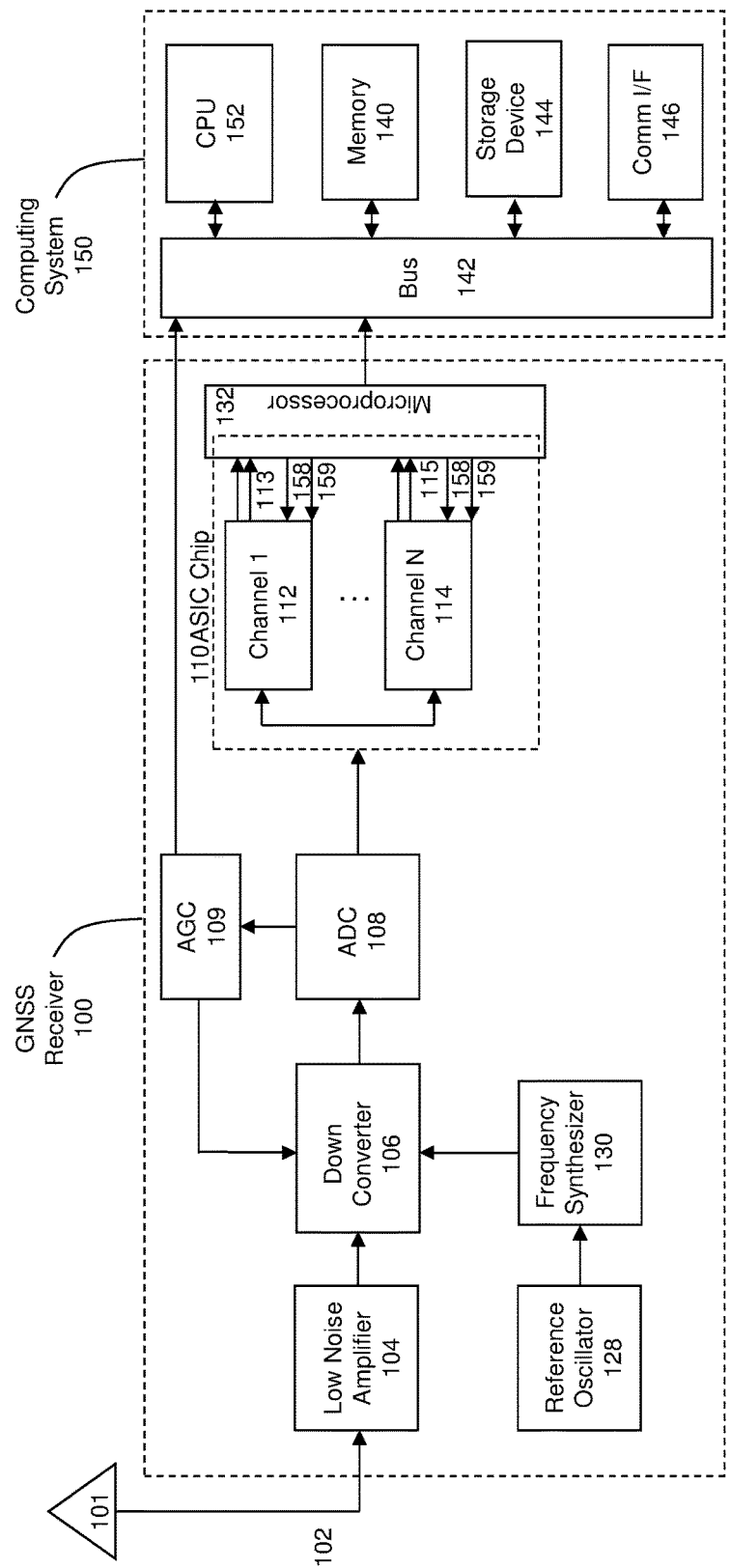
FIG. 1 illustrates an exemplary GNSS receiver and computing system according to various examples.

FIG. 1 illustrates an exemplary GNSS receiver 100 that may be used within a GNSS device to perform land surveying using RTK engine verification according to various examples. GNSS receiver 100 may receive GNSS signals 102, such as GPS or GLONASS signals, via a GNSS antenna 101. GNSS signal 102 may contain two pseudo-noise ("PN") code components, a coarse code, and a precision code residing on orthogonal carrier components, which may be used by GNSS receiver 100 to determine the position of the GNSS receiver. For example, a typical GNSS signal 102 may include a carrier signal modulated by two PN code components. The frequency of the carrier signal may be satellite specific. Thus, each GNSS satellite may transmit a GNSS signal at a different frequency.

GNSS receiver 100 may further include a low noise amplifier 104, a reference oscillator 128, a frequency synthesizer 130, a down converter 106, an automatic gain control (AGC) 109, and an analog-to-digital converter (ADC) 108. These components may perform amplification, filtering, frequency down-conversion, and sampling. The reference oscillator 128 and frequency synthesizer 130 may generate a frequency signal to down convert the GNSS signals 102 to baseband or to an intermediate frequency that depends on the entire receiver frequency plan design and available electronic components. The ADC 108 may then convert the GNSS signals 102 to a digital signal by sampling multiple repetitions of the GNSS signals 102.

GNSS receiver 100 may further include multiple GNSS channels, such as channels 112 and 114. It should be understood that any number of channels may be provided to receive and demodulate GNSS signals 102 from any number of satellites. The GNSS channels 112 and 114 may each contain a demodulator to demodulate a GNSS PN code contained in ADC signal 109, a PN code reference generator, a numerically controlled oscillator (code NCO) to drive the PN code generator as well as a carrier frequency demodulator (e.g., a phase detector of a phase locked loop—PLL), and a numerically controlled oscillator to form a reference carrier frequency and phase (carrier NCO). In one example, the numerically controlled oscillator (code NCO) of channels 112 and 114 may receive code frequency/phase control signal 158 as input. Further, the numerically controlled oscillator (carrier NCO) of channels 112 and 114 may receive carrier frequency/phase control signal 159 as input.

In one example, the processing circuitry for the GNSS channels may reside in an application specific integrated circuit ("ASIC") chip 110. When a corresponding frequency is detected, the appropriate GNSS channel may use the embedded PN code to determine the distance of the receiver from the satellite. This information may be provided by GNSS channels 112 and 114 through channel output vectors 113 and 115, respectively. Channel output vectors 113 and 115 may each contain four signals forming two vectors—inphase I and quadriphase Q which are averaged signals of the phase loop discriminator (demodulator) output, and inphase dI and quadriphase dQ—averaged signals of the code loop discriminator (demodulator) output.

In some examples, a computing system 150 may be coupled to receive position information (e.g., in the form of channel output vectors 113 and 115 or any other representation of position) from GNSS receiver 100. Computing system 150 may include processor-executable instructions for performing RTK verification (e.g., for performing process 200, described in greater detail below with respect to FIG. 2), stored in memory 140. The instructions may be executable by one or more processors, such as a CPU 152. However, those skilled in the relevant art will also recognize how to implement the current technology using other computer systems or architectures. CPU 152 may be implemented using a general or special purpose processing engine such as, for example, a microprocessor, microcontroller or other control logic. In this example, CPU 152 is connected to a bus 142 or other communication medium.

Memory 140 may include read only memory ("ROM") or other static storage device coupled to bus 142 for storing static information and instructions for CPU 152. Memory 140 may also include random access memory (RAM) or other dynamic memory, for storing information and instructions to be executed by CPU 152. Memory 140 may also be used for storing temporary variables or other intermediate information during execution of instructions to be executed by CPU 152.

Computing system 150 may further include an information storage device 144 coupled to bus 142. The information storage device may include, for example, a media drive (not shown) and a removable storage interface (not shown). The media drive may include a drive or other mechanism to support fixed or removable storage media, such as a hard disk drive, a floppy disk drive, a magnetic tape drive, an optical disk drive, a CD or DVD drive (R or RW), or other removable or fixed media drive. Storage media may include, for example, a hard disk, floppy disk, magnetic tape, optical disk, CD or DVD, or other fixed or removable medium that is read by and written to by media drive. As these examples illustrate, the storage media may include a non-transitory computer-readable storage medium having stored therein particular computer software or data.

In other examples, information storage device 144 may include other similar instrumentalities for allowing computer programs or other instructions or data to be loaded into computing system 150. Such instrumentalities may include, for example, a removable storage unit (not shown) and an interface (not shown), such as a program cartridge and cartridge interface, a removable memory (e.g., a flash memory or other removable memory module) and memory slot, and other removable storage units and interfaces that allow software and data to be transferred from the removable storage unit to computing system 150.

Computing system 150 may further include a communications interface 146. Communications interface 146 may be used to allow software and data to be transferred between computing system 150 and external devices. Examples of communications interface 146 may include a modem, a network interface (such as an Ethernet or other NIC card), a communications port (such as for example, a USB port), a PCMCIA slot and card, etc. Software and data transferred via communications interface 146. Some examples of a communication interface 146 include a phone line, a cellular phone link, an RF link, a network interface, a local or wide area network, and other communications channels.

In some examples, GNSS receiver 100 and computing system 150 may be included within a handheld GNSS device similar or identical to that described in U.S. patent application Ser. No. 12/871,705, filed Aug. 30, 2010, issued as U.S. Pat. No. 8,125,376, and assigned to the assignee of the present application, which is incorporated herein by reference in its entirety for all purposes. For example, the handheld GNSS device may include a display, orientation sensors, distance sensors, a camera, a compass, and the like, coupled to GNSS receiver 100 and/or computing system 150.

Figure 2:
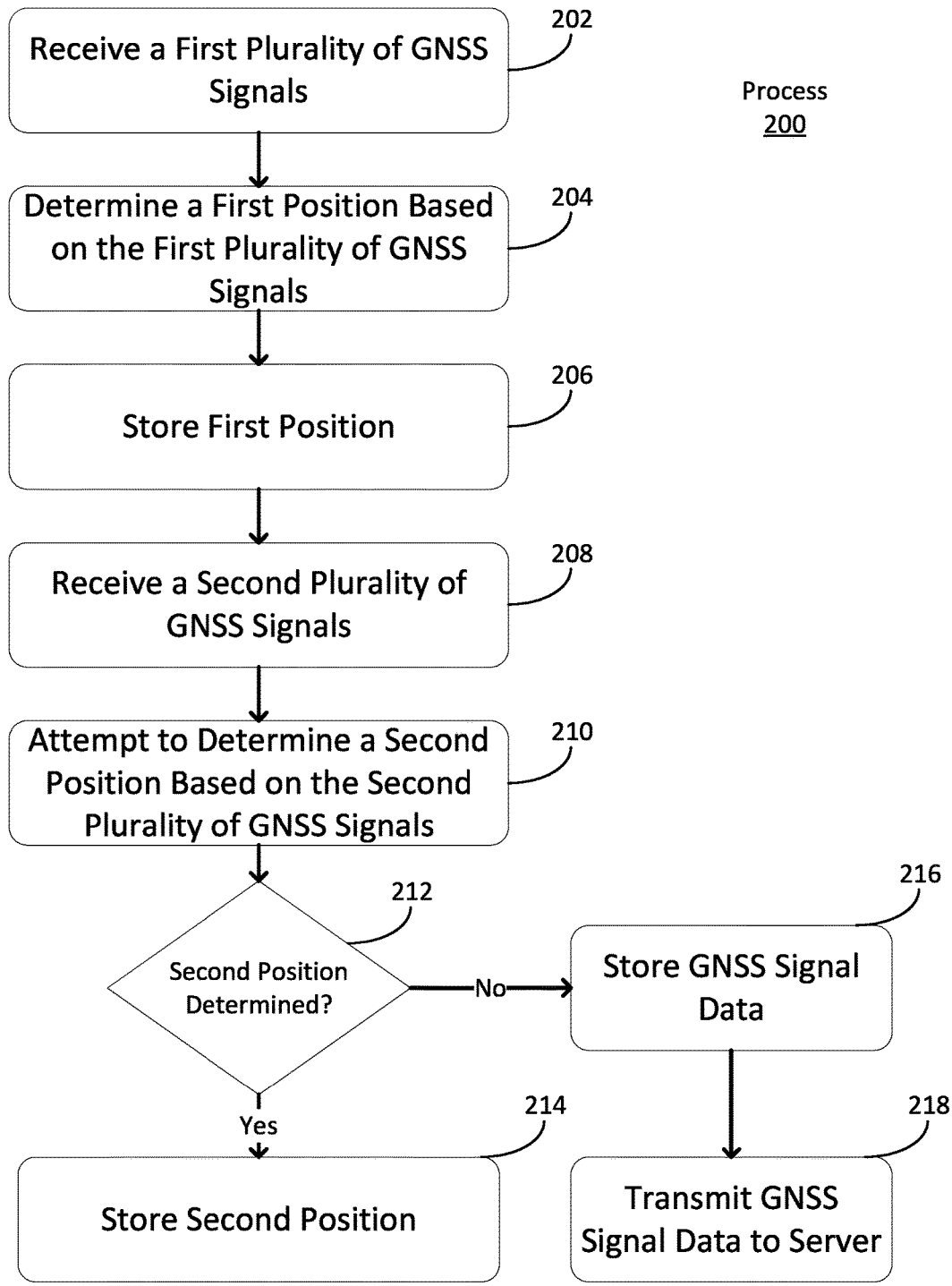
FIG. 2 illustrates an exemplary process for performing land surveying using hybrid RTK engine verification according to various examples.

FIG. 2 illustrates an exemplary process 200 for performing land surveying using hybrid RTK engine verification according to various examples. In some examples, process 200 may be performed by a GNSS device having a GNSS receiver and computing system similar or identical to GNSS receiver 100 and computing system 150.

At block 202, a first plurality of GNSS signals may be received by a GNSS device. The first plurality of GNSS signals may be received, for example, while the GNSS device is positioned over a first point of interest or is in some other position relative to a first point of interest. The plurality of GNSS signals may include GNSS signals from any number of GPS, GLONASS, and/or other satellites and may be received by an antenna (e.g., antenna 101) of a GNSS receiver similar or identical to GNSS receiver 100 of the GNSS device. The received GNSS signals may be processed using RF front-end circuitry of the GNSS receiver. For example, the GNSS signals may be amplified using an amplifier (e.g., low noise amplifier 104) to amplify the received GNSS signals. The amplified GNSS signals may be down-converted to baseband (or another intermediate frequency that depends on the entire receiver frequency plan design and available electronic components) using an oscillator (e.g., reference oscillator 128), a frequency synthesizer (e.g., frequency synthesizer 130), and a down-converter (e.g., down-converter 106). In some examples, an automatic gain control (e.g., AGC 109) may be used to adjust the amount of gain applied to the down-converted GNSS signals to a suitable level. The down-converted GNSS signals may also be converted from analog form to digital form using an analog-to-digital converter (e.g., ADC 108) to produce GNSS signal data. Other methods may also be used to produce GNSS signal data based on the first plurality of GNSS signals. The down-converted GNSS signals may further be demodulated and processed by channels of the GNSS receiver (e.g., channels 112 and 114).

Optionally, a first correction signal from at least one base station (e.g., a GNSS base unit) or network of base stations may also be received by the GNSS device. The base station may also be a virtual base station based on, for example, Continuously Operating Reference Station (CORS) data or data from a similar network. The first correction signal may include correction information that may be used by an RTK engine implemented by the GNSS device to improve the accuracy of the position as determined using the plurality of GNSS signals. In other GNSS devices, multiple RTK engines may be present that determine a set of positions. The first correction signal may be received through, for example, a communications antenna mounted on the GNSS device and connected to a communications receiver or transceiver in the GNSS device (e.g., within communications interface 146).

At block 204, a first position of the GNSS device may be determined using the RTK engine based on some or all of the plurality of GNSS signals received at block 202 and the first correction signal, if used. Using the first position of the GNSS device, a position of the first point of interest may be determined by, for example, knowing the relative position of the GNSS device to the first point of interest or using other techniques, such as photogrammetry. In one case, the GNSS device may be a known height above the point of interest. In another case, the GNSS device may use a camera mounted inside of GNSS device to capture one or more images of the point of interest and use the images to determine a position for the point of interest. The RTK engine may be implemented using an algorithm for computing position and executed on one or more processors (e.g., CPU 152). The RTK engine algorithm may be implemented as software or hardware or a combination of both and may use a set of parameters in computing the position data. Exemplary parameters that may be included in the set of parameters may include parameters specifying: the number of satellites to consider in determining a position of the GNSS device, a fading factor, residual ionosphere estimator parameters, how outlier detection should be handled, the tolerances of the integer ambiguity validation procedure, and the like.

The parameter specifying the number of satellites to consider may be used, for example, to limit an RTK engine to using signals from five UPS satellites and three GLONASS satellites that have the strongest signals. In other examples, satellites from other GNSS constellations may also be used. In another example, this parameter may specify that all available satellites should be used. In yet another example, this parameter may specify that only satellites without multipath error should be used. In this example, the chance of multipath error for a satellite may be estimated based upon the correlation between multipath error and elevation of the satellite with respect to the horizon. By limiting the number of satellites, the RTK engine may provide a position faster than an RTK engine using all available satellites.

In some examples, an RTK engine may employ a recursive algorithm for determining position. In these examples, the RTK engine may employ a parameter specifying the fading factor, which determines the weight to be applied to previous data collected by the RTK engine when updating the position determination. A longer fading factor may provide more stability to the RTK engine. However, a shorter fading factor may provide faster and more accurate results under changing environmental conditions that may affect signal reception at the GNSS device.

A residual ionospheric delay estimator may be used to account for the delay in a signal resulting from the signal traveling through the ionosphere. Several parameters control its operation (e.g., expected residual ionospheric delay and expected time of auto-correlation).

One or more parameters may specify how outlier detection is handled. In a case where the atmospheric channel is assumed to be band-limited white noise with a defined variance, then parameters may be defined that specify how aggressive the RTK engine should be in dropping anomalous measurements that violate this error assumption. For example, a parameter may specify a threshold on the probability of an anomalous measurement. If the measurement has a probability of less than a threshold (e.g., $10^{-7}$ or $10^{-10}$), the RTK engine may handle the measurement as an anomalous measurement and may, for example, drop the measurement. In another example, a threshold may be placed on the error associated with a measurement.

The sets of parameters and/or the algorithms for computing position may be selected for an RTK engine to cause the RTK engine to perform in a desired manner. For example, some configurations of an RTK engine may cause it to produce better results in open areas, while other configurations of an RTK engine may cause it to produce better results under trees. Any desired mix of parameters may be used.

An RTK engine may produce either an RTK Fixed position or an RTK Float position. Whether or not an RTK Fixed position is obtained may depend, in part, on the integer ambiguity validation procedure. For example, an RTK Fixed position may be one that met the tolerances for integer ambiguity. An RTK Float position may be one that has not met the tolerances. The RTK engine may accept one or more parameters that affect the tolerances of the integer ambiguity validation procedure.

In some examples, in addition to determining a position of the GNSS receiver using the RTK engine, an error indicator associated with the determined position may also be produced at block 204. For example, the RTK engine may produce an GNSS error. In other examples, the RTK engine may also indicate the type of solution or position it determined (e.g., float vs. fixed).

A more detailed description of determining a position based on signals from GNSS satellites and base stations is available in U.S. patent application Ser. No. 12/360,808, filed Jan. 27, 2009, published as U.S. Patent Publication No. 2009/0189804, assigned to the assignee of the present application, and which is incorporated herein by reference in its entirety for all purposes. Additionally, a more detailed description of determining a position using multiple RTK engines is available in U.S. patent application Ser. No. 13/437,366, filed Apr. 2, 2012, published as U.S. Patent Publication No. 2012/0256788, assigned to the assignee of the present application, and which is incorporated herein by reference in its entirety for all purposes.

At block 206, assuming the RTK engine algorithm was successful in determining the first position data, the first position data is stored in the GNSS device. The RTK engine algorithm may be considered successful in determining first position data if, for example, it can determine the position to within certain level of confidence as determined by a set of tolerances for the RTK engine. The set of tolerance may be user defined or may be predefined by the manufacture. The set of tolerances may be changed by the user depending on conditions and the requirements of the surveying job. Success of the RTK engine could also be determined, for example, by whether a fixed RTK position is obtained.

At block 208, a second plurality of GNSS signals are received at the GNSS device in a similar manner as discussed with respect to block 202. The GNSS signals may be received from the same set or a different set of GNSS satellites. The second plurality of GNSS signals may be obtained after moving the GNSS device to a location for measuring a position of a second point of interest after the position of the point of interest in blocks 202, 204, and 206 was obtained and stored. In some circumstances, the second point of interest may require that the GNSS device be positioned such that the GNSS device cannot receive GNSS signals as well as it could when determining the first point of interest. For example, the GNSS device may be under a tree or a building or other obstruction may be preventing the GNSS device form having a clear view of some of the sky.

Optionally, a second correction signal from at least one base station (e.g., a GNSS base unit) or network of base stations may also be received by the GNSS device. The base station may also be a virtual base station based on, for example, Continuously Operating Reference Station (CORS) data or data form a similar network. The second correction signal may include correction information that may be used by an RTK engine implemented by the GNSS device to improve the accuracy of the position as determined using the plurality of GNSS signals. In other GNSS devices, multiple RTK engines may be present that determine a set of positions. The second correction signal may be received through, for example, a communications antenna mounted on the GNSS device and connected to a communications receiver or transceiver in the GNSS device (e.g., within communications interface 146). The second correction signal may, however, be block or received in a way that makes the correction signal insufficient for use in determining a position. In these cases, raw GNSS data from the base station may be obtained at a later time to add in determining a position at a later time, as described below.

At block 210, an attempt is made to determine second position data based on the second plurality of GNSS signals. For example, the same RTK engine algorithm used to determine the first position in block 204 using the first plurality of GNSS signals may be executed again in an attempt to determine second position data. Executing the algorithm may requiring starting the algorithm again or may only require feeding the algorithm, which may still be running, some or all of the second plurality of GNSS signals and the second correction signal if it is being used and was received. In some cases, if the second correction signal is not received or is corrupted, because, for example, the GNSS device is out of range of the base station, the RTK engine will attempt to determine the second position data without using a correction signal.

At block 212, it is determined whether the RTK engine was successful in determining the second position in block 210. In one example, the RTK engine was successful in determine the second position because the second position is an RTK Fixed position. In another example, the RTK engine may be successful in determining the second position because other requirements for the second position data were met. In another example, the RTK engine is determined not to be successful in determining the second position data because the RTK engine algorithm timed out without finding a position solution that met the requirements of the RTK engine. In another example, the RTK engine is determined not to be successful when the RTK engine determines a third position, in the form of an RTK Float position, instead of an RTK Fixed position. This may happen, for example, if the second correction signal is not available or the GNSS device's view of the sky is obstructed by buildings, trees, or mountains. The success of the RTK engine may also be determined based on user settings, such as the amount of time allowed without computing an RTK Fixed position or a set of tolerances for the RTK engine.

If the RTK engine was successful in determining the second position in block 212, in block 214, the second position is stored in memory of the GNSS device. The user can then use the second position to determine the position of the second point of interest.

Figure 3:
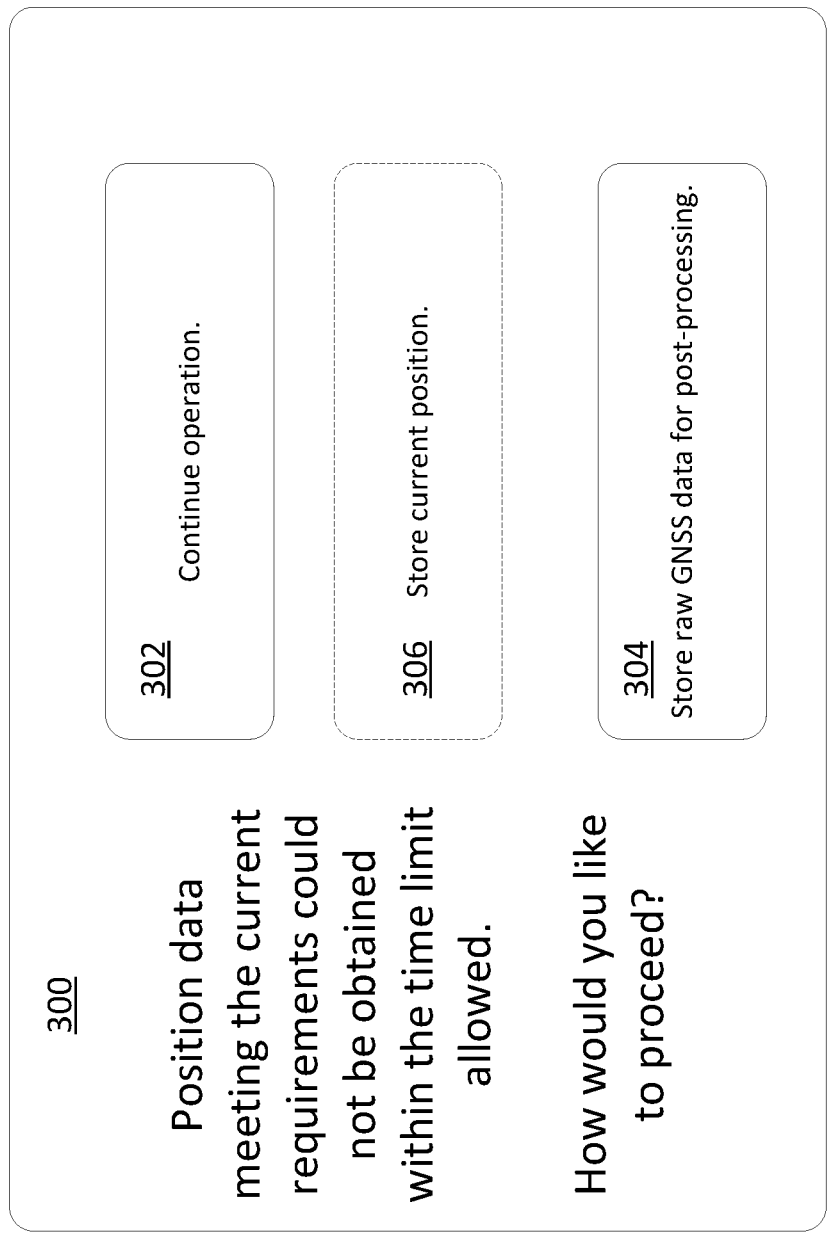
FIG. 3 depicts an exemplary user interface for a user to decide how to proceed after an algorithm fails to obtain a position.

If the RTK engine was unsuccessful in determining the second position in block 212, optionally, the GNSS device may display a prompt on a display of the GNSS device providing the user options for how to continue. For example, the GNSS device may display prompt 300 of FIG. 3. The user may select continue option 302 that restarts or continues the RTK engine. As another example, the user may select option 304 to store raw GNSS or similar data as part of GNSS signal data for post processing. Optionally, the user may also select a store option 306 that stores the position data (e.g., the third position data) that the RTK engine was able to determine in block 210 (FIG. 2). The options may be selected using, for example, a touch screen interface or mechanical buttons located around the display screen. A touch screen or other interface may also be used to input parameters or change settings for the RTK engine. For example, a touch screen could be used to enter a maximum amount of time the RTK engine should attempt to determine a position before it is decided that the RTK engine has failed to determine a position.

Referring back to FIG. 2, in block 216, if the user selected to store raw GNSS or similar data as part of GNSS signal data for post processing or if the GNSS device is setup to store GNSS signal data in response to the RTK engine not obtaining a position, the raw GNSS or similar data is stored as GNSS signal data in memory of the GNSS device. The raw GNSS or similar data may include data obtained from the second plurality of GNSS signals after some amount of processing. The raw GNSS or similar data may also be positional data that was determined to not be accurate enough for the RTK engine to be considered having successfully determined the second position. Optionally, data from a GNSS base unit or other base station, e.g., positional data or correction signals, maybe also be stored as part of the GNSS signal data. Data from the GNSS base unit may be obtained and included in the GNSS signal data at a later time after the raw GNSS or similar data is obtained.

In block 218, the GNSS signal data is sent to a server for post-processing. The GNSS signal data may be sent by the GNSS device or another suitable device (e.g., smartphone, tablet, laptop, workstation, etc.) that has access to the needed data. The data may be sent to the JAVAD Data Processing Online Service (DPOS) or similar server. If GNSS base unit data is present in the GNSS signal data, DPOS may use this data to provide a position that is based on the second plurality of GNSS signals or a correction that can be applied to the GNSS signal data to obtain a position based on the second plurality of GNSS signals. Alternatively, if data from a GNSS base unit is not included in the GNSS signal data, DPOS can use Continuously Operating Reference Stations (CORS) data to provide a position that is based on the second plurality of GNSS signals or a correction that may be applied to the GNSS signal data to obtain a position based on the second plurality of GNSS signals. The results (e.g., a position or correction data) may be transmitted back to the GNSS device or may received by another suitable device (e.g., smartphone, tablet, laptop, workstation, etc.).

It will be appreciated that, for clarity purposes, the above description has described examples with reference to different functional units and processors. However, it will be apparent that any suitable distribution of functionality between different functional units, processors, or domains may be used. For example, functionality illustrated to be performed by separate processors or controllers may be performed by the same processor or controller. Hence, references to specific functional units are only to be seen as references to suitable means for providing the described functionality, rather than indicative of a strict logical or physical structure or organization.

Furthermore, although individually listed, a plurality of means, elements, or method steps may be implemented by, for example, a single unit or processor. Additionally, although individual features may be included in different claims, these may possibly be advantageously combined, and the inclusion in different claims does not imply that a combination of features is not feasible or advantageous. Also, the inclusion of a feature in one category of claims does not imply a limitation to this category, but rather the feature may be equally applicable to other claim categories, as appropriate.

Although a feature may appear to be described in connection with a particular embodiment, one skilled in the art would recognize that various features of the described embodiments may be combined. Moreover, aspects described in connection with an embodiment may stand alone.

What is claimed is:

1. A method of determining positions of a global navigation satellite system (GNSS) device, the method comprising:
   receiving, at the GNSS device, a first plurality of GNSS signals from a first plurality of GNSS satellites;
   receiving, at the GNSS device, a first correction signal from a GNSS base unit;
   executing, on the GNSS device, a first algorithm to determine first position data for the GNSS device based on the first plurality of GNSS signals and the first correction signal;
   storing the first position data in memory of the GNSS device;
   receiving, at the GNSS device, a second plurality of GNSS signals from a second plurality of GNSS satellites;
   executing, on the GNSS device, a second algorithm to determine second position data for the GNSS device based on the second plurality of GNSS signals;
   after determining that the second algorithm fails to determine the second position data, storing GNSS signal data in memory of the GNSS device, wherein the GNSS signal data is based on the second plurality of GNSS signals and data received from the GNSS base unit;
   transmitting the GNSS signal data to a server for processing;
   calculating, at the server, a second correction signal, based on the GNSS signal data; and
   determining the second position data for the GNSS device based on the second plurality of GNSS signals and the second correction signal.

2. The method of claim 1 further comprising:
   receiving position data based on the GNSS signal data from the server.

3. The method of claim 1 further comprising:
   storing data from the GNSS base unit as GNSS signal data.

4. The method of claim 1, wherein the GNSS base unit is a virtual base unit or a reference base station.

5. The method of claim 1, wherein executing the second algorithm does not involve the second algorithm using a correction signal received from the GNSS base unit.

6. The method of claim 1, wherein the first algorithm and the second algorithm are the same algorithm and executing the second algorithm includes providing data from the second plurality of GNSS signals to the first algorithm while the first algorithm is running.

7. The method of claim 1, wherein the first position data is based on a fixed position, and wherein executing a second algorithm to determine the second position data results in determining third position data that is based on a float position.

8. The method of claim 1 further comprising:
determining whether the second algorithm was successful in determining the second position data based on a set of tolerances.

9. The method of claim 1 further comprising:
in response to the second position data not being determined, displaying a prompt on a display of the GNSS device, wherein the prompt allows a user to select a first option or a second option, and wherein the first option causes the storing of the GNSS signal data in memory of the GNSS device and the second option causes the operation of the GNSS device to continue without storing the GNSS signal data.

10. The method of claim 1 further comprising:
determining whether the second algorithm has failed to determine the second position data based on the second algorithm executing for a time equal to or longer than a threshold amount of time.

11. A non-transitory computer readable storage medium encoded with a program for determining a position of a GNSS device, the program comprising instructions for:
executing, on the GNSS device, a first algorithm to determine first position data for the GNSS device based on a first plurality of GNSS signals received at the GNSS device from a first plurality of GNSS satellites and a first correction signal received at the GNSS device from a GNSS base unit;
storing the first position data in memory of the GNSS device;
executing, on the GNSS device, a second algorithm to determine second position data for the GNSS device based on a second plurality of GNSS signals receive at the GNSS device from a second plurality of GNSS satellites; and
after determining that the second algorithm fails to determine the second position data, storing GNSS signal data in memory of the GNSS device, wherein the GNSS signal data is based on the second plurality of GNSS signals and data received from the GNSS base unit;
transmitting the GNSS signal data to an external device for processing;
calculating, at the external device, a second correction signal, based on the GNSS signal data; and
determining the second position data for the GNSS device based on the second plurality of GNSS signals and the second corrections signal.

12. The non-transitory computer readable storage medium of claim 11, the program further comprising instructions for:
receiving position data based on the GNSS signal data from the external device.

13. The non-transitory computer readable storage medium of claim 11, the program further comprising instructions for:
storing data from the GNSS base unit as GNSS signal data.

14. The non-transitory computer readable storage medium of claim 11, wherein the GNSS base unit is a virtual base unit or a reference base station.

15. The non-transitory computer readable storage medium of claim 11, wherein executing the second algorithm does not involve the second algorithm using a correction signal received from the GNSS base unit.

16. The non-transitory computer readable storage medium of claim 11, wherein the first algorithm and the second algorithm are the same algorithm and executing the second algorithm includes providing data from the second plurality of GNSS signals to the first algorithm while the first algorithm is running.

17. The non-transitory computer readable storage medium of claim 11, wherein the first position data is based on a fixed position, and wherein executing a second algorithm to determine the second position data results in determining third position data that is based on a float position.

18. The non-transitory computer readable storage medium of claim 11, the program further comprising instructions for:
determining whether the second algorithm was successful in determining the second position data based on a set of tolerances.

19. The non-transitory computer readable storage medium of claim 11, the program further comprising instructions for:
in response to the second position data not being determined, displaying a prompt on a display of the GNSS device, wherein the prompt allows a user to select a first option or a second option, and wherein the first option causes the storing of the GNSS signal data in memory of the GNSS device and the second option causes the operation of the GNSS device to continue without storing the GNSS signal data.

20. The non-transitory computer readable storage medium of claim 11, the program further comprising instructions for:
determining whether the second algorithm has failed to determine the second position data based on the second algorithm executing for a time equal to or longer than a threshold amount of time.

21. A GNSS system comprising:
an antenna configured to receive a first plurality of GNSS signals from a first plurality of GNSS satellites and a second plurality of GNSS signals from a second plurality of GNSS satellites;
a communications interface configured to receive correction signals from a GNSS base unit;
a processor coupled to the antenna and communications interface for processing data from the first plurality of GNSS signals and the second plurality of GNSS signals;
an external device;
memory storing processor executable instructions for:
executing, on the GNSS device, a first algorithm to determine first position data for the GNSS device based on the first plurality of GNSS signals and a first correction signal received at the GNSS device from the GNSS base unit;
storing the first position data in memory of the GNSS device;
executing, on the GNSS device, a second algorithm to determine second position data for the GNSS device based on the second plurality of GNSS signals; and
in response to the second algorithm failing to determine the second position data, storing GNSS signal data in memory of the GNSS device, wherein the GNSS signal data is based on the second plurality of GNSS signals; and transmitting the GNSS signal data to the external device;

calculating, at the external device, a second corrections signal, based on the GNSS signal data; and determining the second position data for the GNSS device based on the second plurality of GNSS signals and the second correction signal.

22. The GNSS system of claim 21, the memory further comprising processor executable instructions for:

receiving position data based on the GNSS signal data from the external device.

23. The GNSS system of claim 21, the memory further comprising processor executable instructions for:

storing data from the GNSS base unit as GNSS signal data.

24. The GNSS system of claim 21, wherein the GNSS base unit is a virtual base unit or a reference base station.

25. The GNSS system of claim 21, wherein executing the second algorithm does not involve the second algorithm using a correction signal received from the GNSS base unit.

26. The GNSS system of claim 21, wherein the first algorithm and the second algorithm are the same algorithm and executing the second algorithm includes providing data from the second plurality of GNSS signals to the first algorithm while the first algorithm is running.

27. The GNSS system of claim 21, wherein the first position data is based on a fixed position, and wherein executing a second algorithm to determine the second position data results in determining third position data that is based on a float position.

28. The GNSS system of claim 21, the memory further comprising processor executable instructions for:

determining whether the second algorithm was successful in determining the second position data based on a set of tolerances.

29. The GNSS system of claim 21, the memory further comprising processor executable instructions for:

in response to the second position data not being determined, displaying a prompt on a display of the GNSS device, wherein the prompt allows a user to select a first option or a second option, and wherein the first option causes the storing of the GNSS signal data in memory of the GNSS device and the second option causes the operation of the GNSS device to continue without storing the GNSS signal data.

30. The GNSS system of claim 21, the memory further comprising processor executable instructions for:

determining whether the second algorithm has failed to determine the second position data based on the second algorithm executing for a time equal to or longer than a threshold amount of time.

* * * * *